July 27, 1965 T. A. CARSON 3,196,673
DEVICE FOR TESTING AUTOMOTIVE COOLING SYSTEMS
Filed Jan. 5, 1962 2 Sheets-Sheet 1
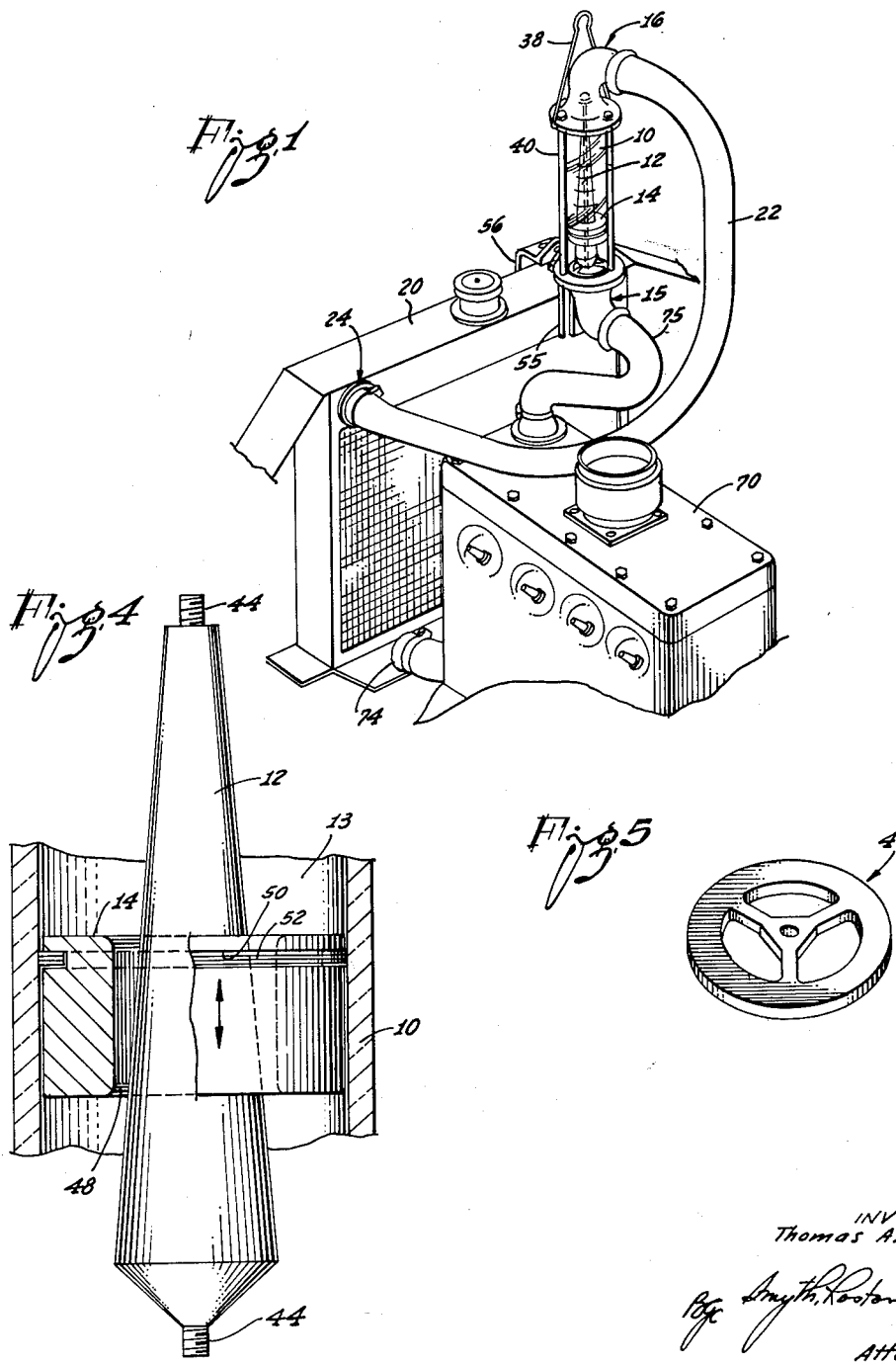
INVENTOR:
Thomas A. Carson
Attorneys July 27, 1965 T. A. CARSON 3,196,673
DEVICE FOR TESTING AUTOMOTIVE COOLING SYSTEMS
Filed Jan. 5, 1962 2 Sheets-Sheet 2
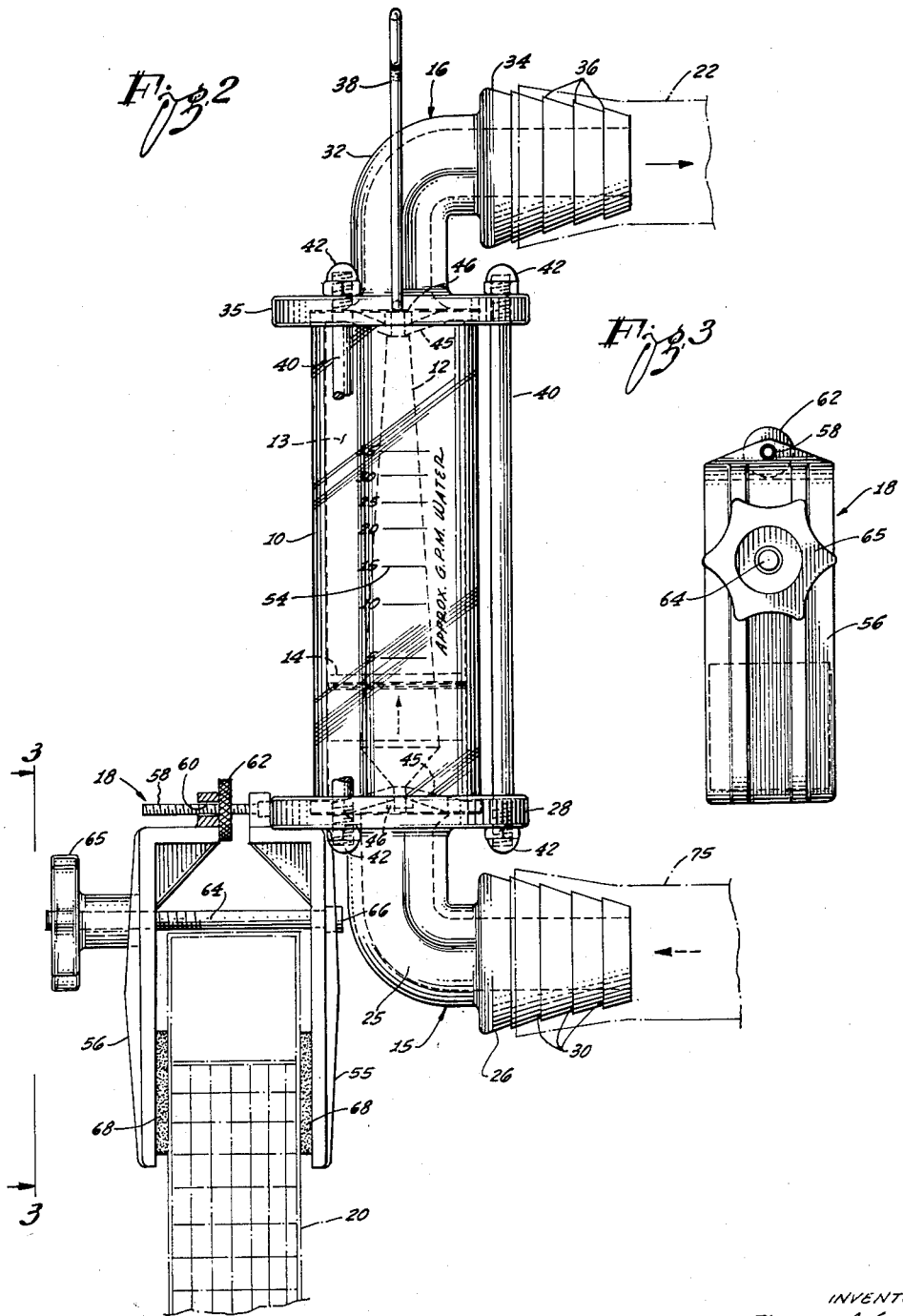
INVENTOR:
Thomas A. Carson
Attorneys.

United States Patent Office 3,196,673
Patented July 27, 1965

3,196,673
DEVICE FOR TESTING AUTOMOTIVE
COOLING SYSTEMS
Thomas A. Carson, La Puente, Calif., assignor to The
Ni-Arb Co., Inc., El Monte, Calif., a corporation of
California
Filed Jan. 5, 1962, Ser. No. 164,471
1 Claim. (Cl. 73—118)

This invention relates to a test device for quickly and reliably determining the operating condition of a liquid cooling system of an automotive vehicle.

There has been a long felt pressing need for some means for testing the overall efficiency of such a cooling system. In the absence of such an overall test means, it has been necessary to rely solely on indications of the engine temperature. The difficulty is that the efficiency of a cooling system may progressively deteriorate to a serious extent without being noticed simply because the automobile is used only moderately and a moderately burdened engine may be maintained in a normal temperature range by the poorly functioning cooling system. The operator is lulled into a sense of security and when the engine is then called upon for sustained high-energy output, the engine may heat up excessively, unnoticed by the operator, with consequent serious and costly damage. It is only too easy for such damage to occur because usually the peak performance of the engine is required under conditions that distract the driver's attention from the temperature gauge on the instrument board.

To avoid such damage and the possibility of being delayed and inconvenienced by an overheated engine, the prudent driver may have the radiator of the automobile flushed out periodically. It is usually assumed that if the water is observed to flow freely out of a radiator during the flushing operation, the cooling system is in good order. This assumption is unwarranted for several reasons.

In the first place, the pressure of the water supply employed for the flushing operation may be so much higher than the normal pressure generated in the cooling system that the flow behavior in the flushing action is badly misleading. In the second place, a test of the freedom for flow through the radiator alone leaves unanswered the question of whether or not the fluid passages in the engine block may be impaired. In the third place, with all of the fluid passages of the cooling system in good order, serious damage by overheating may occur because of malfunctioning of the water pump. It is because of these considerations that some means is needed to test the actual performance of a whole cooling system.

The invention solves the problem by providing an accurate flow meter and by further providing for temporarily placing such a flow meter in series with the radiator and the engine block of an automobile. The cooling system of any particular model automobile is designed for some particular rate of flow or normal range of fluid flow, and if the flow meter of the present invention indicates that such rate or normal rate range is achieved, there can be no doubt about the overall operating condition of the whole cooling system.

A feature of the invention is the manner in which the flow meter is adapted for test usage. A provision for this purpose is a highly advantageous support means on the flow meter itself adapted for convenient releasable engagement with a part of an automobile to support the flow meter in position for carrying out a test. Preferably the engagement means simply releasably clamps onto the automobile radiator in engagement with the opposite faces of the radiator.

Another feature of the invention is the concept of employing for the test the existing short hose of the automobile cooling system that connects the upper part of the engine block with the upper inlet port of the radiator. With the flow meter temporarily clamped onto the radiator within the range of the length of this short hose, it is a simple matter to disconnect the short hose from the upper inlet port of the radiator and to reconnect the short hose with the inlet port of the flow meter. Thus this concept makes it necessary merely to equip the flow meter with a second longer hose for connecting the flow meter outlet with the upper inlet port of the radiator. The flow meter is then in series with the cooling system of the automobile and starting the engine causes the flow meter to indicate clearly and precisely the operating condition of the cooling system.

It is contemplated that a flow meter will be used that is characterized by a variable cross-sectional area and constant head, such as a rotameter-type or a piston-type flow meter. In the preferred practice of the invention, a rotameter-type is used wherein a so-called float responds to fluid flow by rising in a tapered passage in accord with the rate of flow. The term "rotameter" has become well established because in some instances the float actually rotates, but rotation is not necessary. The so-called float is actually a weight, but since the weight behaves like a float, the term float has been widely accepted and therefore is used in describing and claiming the present invention.

An important feature of the preferred practice of the invention is a rotameter construction that is both accurate and economical in cost. The tapered passage in which the float operates may be formed either by using a tapered cylinder or by using a straight cylinder with a tapered axial spindle inside the cylinder. In either event, the cylinder must be made of transparent material, preferably glass, to make the float visible. Unfortunately, a glass cylinder that is tapered with acceptable accuracy is unduly expensive and especially so when it is considered that glass cylinders that are employed frequently for testing operations are subject to breakage. On the other hand, a straight glass cylinder is relatively inexpensive but only approximates accurate configuration because of minute departures from precise internal cylindrical configuration along the length of the cylinder.

The invention meets this situation by using an accurately tapered axial spindle inside a straight glass cylinder to provide a tapered fluid passage for an annular float, and by further providing the annular float with outer circumferential means that resiliently span the outer circumferential space between the float and the surrounding glass cylinder to prevent any substantial outer circumferential flow around the annular float. With such an arrangement, the flow measurement is accurate because the fluid steam is diverted to the inner annular space defined by the accurately tapered spindle and the constant inner circumferential dimension of the annular float.

In the present embodiment of the invention, the resilient means is a strip of a suitable plastic such as polytetrafluoroethylene, the strip being in the form of a flat helical coil. The helical coil is confined by an outer circumferential groove of the annular float and is biased radially outward to follow the minute changes in configuration of the inner circumferential surface of the glass cylinder along the length of the cylinder.

The various features and advantages of the invention may be understood from the following detailed description and the accompanying drawing.

In the drawing, which is to be regarded as merely illustrative:

FIG. 1 is a perspective view of the presently preferred embodiment of the invention, the test device being shown clamped onto a radiator of an automobile in series with the engine block and the radiator;

FIG. 2 is an enlarged side elevational view of the invention;

FIG. 3 is an elevation of the means that clamps the flow meter in position on a radiator, the elevation being taken as seen along the line 3—3 of FIG. 2;

FIG. 4 is an enlarged fragmentary sectional view showing the construction of the annular float and showing the configuration of the associated tapered axial spindle; and FIG. 5 is a perspective view of one of the two spiders that is employed to anchor the tapered spindle in its assembled position.

The principal parts of the selected embodiment of the flow meter shown in FIG. 2 include: a straight glass cylinder 10; a uniformly tapered spindle 12 positioned axially inside the cylinder and forming therewith a tapered annular flow passage 13; an annular float 14 surrounding the spindle 12 and free to rise in the annular flow passage; an upper outlet fitting, generally designated 16, providing an outlet port for the upper end of the annular flow passage; and clamp means, generally designated 18, for releasable engagement with a radiator 20 of an automotive vehicle. In addition, the test device further includes a relatively long hose 22 that is shown in FIG. 2 for releasably connecting the outlet fitting 16 with the upper inlet port 24 of the radiator 20.

The lower inlet fitting 15 comprises a pipe elbow 25 with an enlargement 26 on one end of the elbow and a flange 28 on the other end of the elbow, the flange being recessed to seat the lower end of the glass cylinder 10. The enlargement 26 is of tapered construction formed with a series of circumferential shoulders 30 of progressively decreased diameter. Such a tapered enlargement is adapted to telescope into a hose and the plurality of shoulders 30 make it possible for the enlargement to make effectively sealed connection with hoses of various diameters.

The upper outlet fitting 16 also comprises a pipe elbow 32 having an enlargement 34 on one end and a flange 35 on the other end, the flange being recessed to seat the upper end of the glass cylinder 10. The enlargement 34 is also of tapered construction with a plurality of circumferential shoulders 36 of progressively decreased diameter to fit a range of hose sizes. The enlargement 34 is telescoped into the end of the hose 22 in a wedging manner that makes the joint fluid-tight. In the construction shown, the flange 35 has a pair of diametrically opposite radial bores to receive the opposite inturned ends of a wire bail 38 which serves as a handle for the device and which also permits the device to be hung on a nail, hook or bracket when not in use. The inlet fitting 15 and the outlet fitting 16 are interconnected by four tension rods 40 which extend through corresponding bores in the two fitting flanges 28 and 35 and which are equipped with suitable nuts 42 for engagement with the flanges.

The tapered spindle 12 may be mounted in any suitable manner. In this embodiment, the opposite ends of the tapered spindle 12 have threaded axial extensions 44 (FIG. 4), each of which extends through a corresponding spider 45 of the character shown in FIG. 5, each threaded extension being equipped with a nut 46 for engagement with the spider. The two spiders 45 are made of a suitable plastic, preferably an elastomer such as neoprene reinforced with fabric.

The annular float 14 may comprise a solid body of metal, such as brass, with an internal diameter dimensioned for relatively close fit with the tapered axial spindle 12 when the float is at its lowermost position. It is apparent that movement of the float 14 upward in the annular passage 13 results in corresponding increase in the cross-sectional area of the annular space 48 defined by the axial spindle 12 and the surrounding float 14.

When fluid flows upward through the annular passage 13, the float 14 is elevated by the upwardly flowing fluid stream with consequent increase in the cross-sectional area of the annular space 48 until the cross-sectional area of the annular space is adequate to accommodate the rate of flow of the fluid stream. Thus the elevation of the float 14 indicates the rate of flow of the coolant liquid through the cooling system of the automotive vehicle.

To minimize or substantially eliminate upward flow of the fluid around the periphery of the float 14 between the float and the surrounding glass cylinder 10, the float is provided with a circumferential groove 50 to receive a flat plastic strip 52. The plastic strip 52, which may be a strip of polytetrafluoroethylene, is wound edgewise to helical form with the circumferential extent of the helix substantially in excess of 360° and with the successive turns of the strip in close face-to-face relationship. This particular plastic is resilient and the helically wound plastic is biased to tend to expand radially outward for continuous contact with the inner surface of the glass cylinder 10. Thus the plastic strip 52 presses lightly radially outwardly to follow the inner circumferential surface of the straight glass cylinder 10 notwithstandnig minor irregularities in the surface and notwithstanding any departure from the roundness of the internal cross section of the glass cylinder.

The glass cylinder 10 has a suitable scale 54 etched thereon which scale may be calibrated to indicate gallons per minute of water flow. The upper edge of the circumferential plastic strip 52 serves as a convenient index to indicate values on the scale 54. The plastic strip 52 in preventing peripheral flow of the liquid around the float 14 causes all of the flow of the liquid through the annular passage 13 to be restricted to the previously mentioned inner annular space 48 between the axial spindle 12 and the inner circumference of the annular float 14.

The clamp means 18 may be of any suitable construction. In the arrangement shown in the drawing, a downwardly extending clamp jaw 55 is integral with the flange 28 of the inlet fitting 15. A second movable clamp jaw 56 is mounted on a screw 58 that is fixedly carried by the flange 28 of the inlet fitting 15 and extends rigidly radially outward from the flange. The movable clamp jaw 56 is formed with a transverse bore 60 at its upper end to receive the screw 58, the bore being slightly oversized to permit an appreciable range of pivotal movement of the jaw in the plane of the screw. The upper end of the movable clamp jaw 56 abuts a knurled nut 62 which is rotatable to vary the spacing between the upper ends of the two clamp jaws 55 and 56.

The two downwardly extending jaws 55 and 56 are adjustably connected at lower intermediate portions thereof by a screw 64 and a nut means in the form of a rotary knob 65 that is threaded onto the screw. The screw 64 extends through aligned bores in the two clamp jaws 55 and 56 and is formed with a head 66 that engages the outer surface of the fixed clamp jaw 55. The rotary knob 65 abuts the outer surface of the movable clamp jaw 56.

It is apparent that the rotary knob 65 may be tightened to cause the two jaws 55 and 56 to grip a radiator 20 of an automotive vehicle in a firm manner to hold the flow meter upright on the radiator. The knurled nut 62 serves as a fulcrum for the upper end of the movable clamp jaw 56 and may be adjusted for variably spacing apart the upper ends of the two jaws as required for the two jaws to grip radiators of different thicknesses. Preferably each of the two jaws 55 and 56 is lined with an elastomer pad 68 to avoid marring the radiator 20.

The manner in which the invention serves its purpose may be readily understood from the foregoing description. FIG. 1 shows the previously mentioned radiator 20 of an automotive vehicle, the engine block 70 of the vehicle, a lower hose 72 which interconnects the engine block with a lower outlet port 74 of the radiator and a second short upper hose 75 which normally connects the upper part of the engine block with the previously mentioned upper inlet port 24 of the radiator.

The first step in the temporary installation of the device for a test procedure is to clamp the device on the radiator 20 by means of the clamp means 18, the selected position of the flow meter being within the range of the length of the short upper hose 75. The short upper hose 75 is then disconnected from the upper inlet port 24 of the radiator and is connected to the lower inlet fitting 15 of the flow meter. To connect the short hose 75 to the flow meter, it is merely necessary to telescope the end of the hose over the tapered enlargement 26 of the flow meter, the hose making sealing contact with a selected one of the circumferential shoulders 30 in accord with the particular inside diameter of the hose.

One end of the hose 22 is then connected to the tapered enlargement 34 of the flow meter and the other end of the hose is connected to the inlet port 24 of the radiator. A single piece of hose 22 of a standard dimension may be used for most cars but if a hose of smaller diameter or larger diameter is necessary for connection to the radiator port 24, a hose of the particular diameter may be used since the tapered enlargement 34 of the flow meter will wedge into hoses of a range of different internal diameters.

With the described test apparatus temporarily installed in the manner shown in FIG. 1, the flow meter is in series with the engine block 70 and the radiator 20 and thus becomes a part of the liquid cooling system of the automotive vehicle. When the engine is then started the consequent flow of the cooling liquid through the flow meter causes the float 14 to rise in accord with the rate of fluid flow and the rate of fluid flow in terms of gallons per minute may be ascertained at a glance by noting the position of the upper edge of the helical plastic strip 52 relative to the scale 54. As heretofore stated, there is a normal rate of flow or a normal range of rates of flow for every model of automotive vehicle so that the gallons per minute read from the scale 54 and will indicate in a positive and reliable manner the overall efficiency of any automotive cooling system.

The polytetrafluoroethylene strip 52 in combination with the groove 50 in which it is mounted serves as means to prevent peripheral flow around the port 14 and thus promotes the accuracy of the flow meter. Polytetrafluoroethylene has an exceedingly low coefficient of friction relative to the glass cylinder 10 and especially so when it is submerged in the coolant liquid. The helical plastic strip closely follows the internal configuration of the upright glass cylinder 10. It has been found that if the glass tube 10 is uniformly out of round the effectiveness of the helical strip 52 will actually increase with the passage of time since the helical strip gradually changes its configuration until it conforms closely with the out of round configuration of the glass cylinder.

My description in specific detail of the selected embodiment of the invention will suggest various changes, substitutions and other departures from my disclosure within the spirit and scope of the appended claim.

I claim:

A device to measure the rate of flow of fluid through the cooling system of an automotive vehicle, wherein an upper part of a radiator of the vehicle is connected by a short hose of the vehicle to an engine block of the vehicle, said device comprising:

an upright cylinder having a light-transmitting wall, said cylinder being of approximately uniform internal cross section with minor variations along its length;

an upright spindle inside the cylinder, said spindle being progressively reduced in cross section from its lower end to its upper end to form with the cylinder an upright annular passage that progressively increases in cross-sectional area from its lower end to its upper end, the lower end and the upper end of said annular passage having an inlet port and an outlet port, respectively;

An annular float positioned in said annular passage to be elevated by said fluid stream, said annular float surrounding said tapered spindle, whereby the annular clearance between the tapered spindle and the float progressively increases with the elevation of the float;

resilient means carried by and surrounding said float, said resilient means being biased radially outward against said inner surface of said cylinder to follow the minor variations in internal cross section of the cylinder and to minimize upward flow of the fluid past the perimeter of the float whereby the elevation of the float by the fluid stream is determined substantially entirely by the cross-sectional area of said annular clearance that is necessary to accommodate the rate of flow of the stream;

a downwardly extending jaw member mounted on the lower end of said cylinder to engage one face of said radiator;

a second downwardly extending jaw member mounted on the lower end of said cylinder to engage the other face of the radiator, and means interconnecting portions of said two jaw members, said interconnecting means being adjustable to close the jaw members on the radiator to support said cylinder;

means to releasably connect said inlet port to said engine block to receive coolant fluid therefrom; and means to releasably connect said outlet port to said radiator to deliver the coolant fluid thereto.

References Cited by the Examiner

UNITED STATES PATENTS

| | | | |
|---|---|---|---|
| 979,516 | 12/10 | Kuppers | 73—209 |
| 1,578,193 | 3/26 | Drake | 73—347 XR |
| 1,654,421 | 12/27 | Knerr. | |
| 1,980,761 | 11/34 | Mock et al. | 73—209 |
| 2,958,760 | 11/60 | McNalley | 248—226 XR |

OTHER REFERENCES 2 pages 277–188; February 3, 1956; "Teflon Spiral Back-Up Rings."

RICHARD C. QUEISSER, *Primary Examiner.*

ROBERT EVANS, *Examiner.*